Aug. 29, 1961 M. JAHN 2,998,109
MOUNTING CLIPS
Filed March 11, 1959
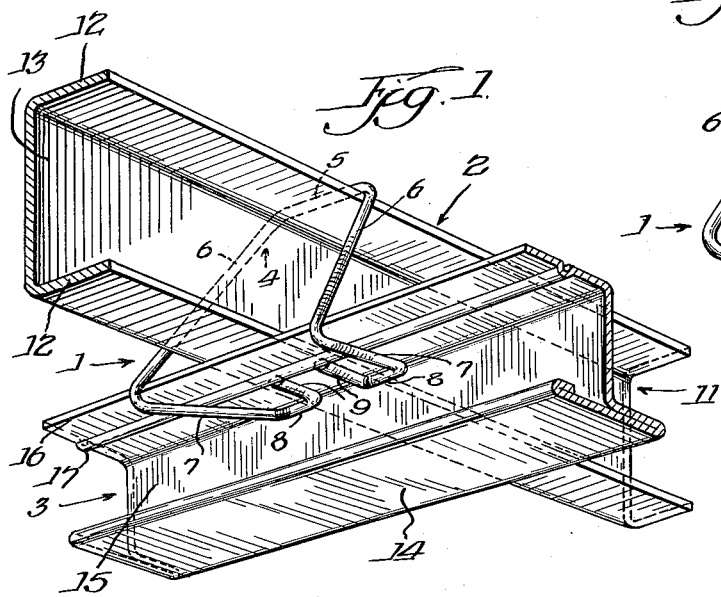
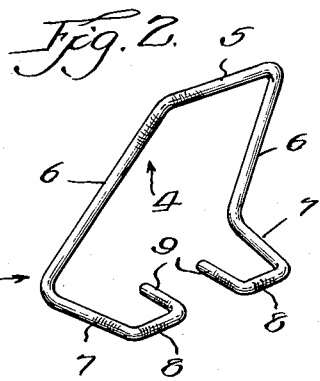
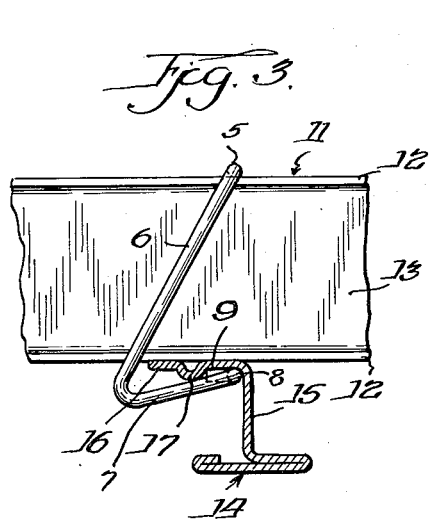
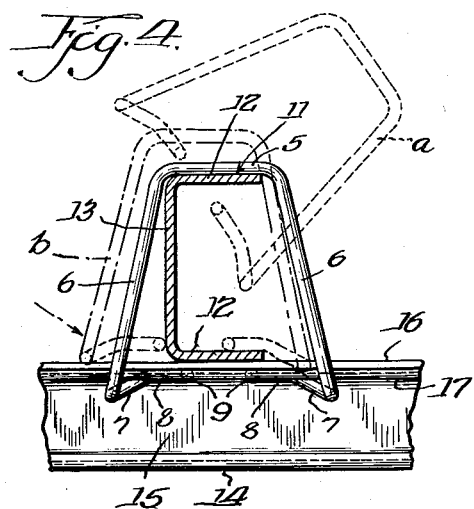
Inventor:
Martin Jahn.

United States Patent Office 2,998,109
Patented Aug. 29, 1961

2,998,109
MOUNTING CLIPS
Martin Jahn, Chicago, Ill., assignor to Chicago Metallic Sash Co., Chicago, Ill., a corporation of Illinois
Filed Mar. 11, 1959, Ser. No. 798,716
5 Claims. (Cl. 189—35)

The invention relates generally to attaching clips and the like and more particularly to a hanger clip for securing a pair of transverse members to one another.

In the past a number of types of clips have been employed, one of which has proved to be quite popular, is that illustrated in Nelson Patent No. 2,767,440, issued October 23, 1956. However, due to the particular shape employed therein and the nature of the gripping function of the clip, it has been necessary to fabricate the same out of relatively stiff material in order to provide adequate retaining action. Also as only point contacts spaced apart approximately the width of the transverse member to which the runner is to be secured was obtained, it was necessary to rely on the clamping action to restrict a twisting action of the runner about its engagement with the clip. Furthermore, in the clip described, retention of the clip on the runner was also dependent upon the resiliency or stiffness of the clip.

The present invention has among its objects the production of a clip for securing a pair of members such as a supporting channel or the like and an elongated runner, which clip eliminates disadvantages inherent in previous clips and combines efficient operation with extreme simplicity and low cost of manufacture.

Another object of the invention is the production of such a clip which is so designed that it may be readily applied and at the same time provide a retention action which completely eliminates any possibility of the clip being inadvertently disengaged, the construction being such that the retaining elements with tend to bite into the material of the runner when the clip is sought to be moved in a disengaging direction, the construction being such that the clip may be very readily applied with a minimum of force.

A further object of the invention is the production of such a clip wherein the support of the runner by the clip may be substantially directed aligned with the web of the runner and also transversely thereto, whereby the line of support of the clip on the supporting member is substantially in line with the web so that the load is carried in a more or less vertical plane from the engagement of the clip with the support to the load supporting portion of the runner, and providing support in transverse direction to eliminate any tendency for the runner to twist about its connection with the clip as would be the case where the clip engages the flange of the runner merely at points spaced laterally from the plane of the runner web, as well as at the sides of the supporting member.

Many other objects and advantages of the construction herein shown and described will be obvious to those skilled in the art from the disclosure herein given.

In the drawings, wherein like reference characters indicate like or corresponding parts:

FIG. 1 is a perspective view of a portion of a supporting channel, and a flanged T-runner secured thereto by means of a clip embodying the present invention;

FIG. 2 is a perspective view of an unmounted clip;

FIG. 3 is a side elevation of the clip illustrated in FIG. 1 in its mounted position; and FIG. 4 is a front view of the clip illustrated in FIG. 2.

The present invention contemplates the production of a hanger clip which employs the extreme free ends of the clip to provide a retaining action and at the same time provide a plurality of transverse line contacts at the engaging points of the clip with the runner as distinguished from a point contact, and as such line contact may extend for a material portion of the width of the runner flange directly below the supporting member, as well as along the web, a very effective connection is provided wherein there is no tendency of the runner to pivot about the lines of engagement with the clip. Obviously where point contacts are utilized, as for example, where a small projection or hump engages the flange, any tendency of the runner to rock about a line connecting the projections or hump is resisted merely by the flat surface of the flange in engagement with the channel or other supporting member, and this is dependent to a large extent on the inherent resiliency of the runner and of the adjacent portion of the clip.

Referring to the drawings, the reference numeral 1 indicates generally a clip constructed in accordance with the present invention illustrated in FIG. 1 as being positioned at the juncture of a channel-shaped supporting member 2 and a T-shaped runner 3, the clip being illustrated in operative position to secure the channel and runner together.

As illustrated in FIG. 2, the clip comprises a generally U-shaped body portion 4 having an intermediate portion 5 connecting a pair of leg portions 6 which diverge outwardly from their connection with the intermediate portion 5 and terminate at their free ends in arms 7 extending transversely to the plane of the body portion 4, and as illustrated in FIG. 4, may converge toward their outer ends.

The free ends of each arm 7 are bent back laterally toward one another to form transverse portions 8, the free end or leg portions 9 being bent toward the plane of the body portion 4.

Referring to FIG. 1, the clip is adapted to be snapped into the channel-runner assembly, the intermediate portion 5 of the clip resting on the top 11 of the member 2 which is illustrated as being generally C-shaped, having a pair of substantially parallel flanges 12 connected by a central web 13. In like manner the particular runner 3 is formed from a single sheet of material bent to form a T-shaped structure having a head portion 14 and a shank portion 15, the free end of the latter being provided with a mounting flange 16 adapted to seat on the lower flange 12 of the channel. As illustrated in FIGS. 1 and 2, the flange 16 of the runner is provided with a downwardly directed bead 17 which extends longitudinally along the flange, spaced inwardly from both edges of the latter. The runner illustrated is of generally standard commercial form and the details of which form no part of the present invention, and the clip may of course be used with runners of various configurations.

Referring to FIGS. 2 and 4, particularly the latter, in the embodiment illustrated the distance between the free end portions or legs 9 is less than the width of the respective flanges 12 so that the end portions 9 and at least a part of the transverse portions 8 underlie the lower flange 12 with the flange 16 of the runner being clamped directly between such portions of the clip and the flange 12. In such relation there is no tendency for the clip to deform the flange 16, as might otherwise exist if the clip engaged the runner at points which are spaced apart a greater distance than the width of the flange 12.

In applying the clip illustrated to the assembly, the clip is first engaged with a portion of the support member 2 not engaged with the runner by inserting the upper flange 12 of the runner between the portions 9 of the clip, sliding the latter over the flange, as indicated in dotted lines *a* in FIG. 4 and down the web 13 as indicated in dotted lines *b*, in which position the right hand portions 8 and 9 will be positioned above the lower flange 12 and the left hand portions adjacent the juncture of the web 13 and the lower flange 12. Upon a slight pressure of the clip in the direction indicated by the broken arrow, the left hand portions 8 and 9 may be slid under the flange 12 to move the right hand portions laterally off the upper face of the lower flange 12. The clip may then be slid longitudinally along the support member to the runner.

Referring to FIG. 2, it will be noted that the distance between the intermediate portion 5 and the plane of the portions 8 and 9 of the clip is less than the corresponding depth of the channel 2 and thickness of the flange 16 of the runner so that the clip must be sprung into engagement with the runner. Following such application of the clip to the channel, the clip may be manually pressed toward the runner, suitably grasping the leg portions 6 with the thumbs or the like, and upon application of sufficient pressure, the free ends 8 and 9 of the clip may be sprung over the bead 17. This may be accomplished quite easily as it is unnecessary to make the clip of heavy stock of the size employed in clips such as those illustrated in Nelson Patent No. 2,767,440 heretofore referred to, as the spring action takes place primarily in the angle between the arms 7 and their associated leg portion 6. In contrast to such a construction it will be noted that clips such as Nelson employing laterally inset portions require material sufficiently rigid to take the relatively high torsion action resulting from the inherent shape of the clip. Consequently a clip constructed in accordance with the present invention may be applied with a relatively light amount of pressure.

However, while merely a light pressure is required in applying the clip, due to the arrangement of the free ends 9, which are directed rearwardly toward the body of the clip, such free ends will engage the bead 17 upon movement of the clip in a direction to disengage the same from the runner, resulting in a very strong biting engagement between the clip and the runner, so that removal of the clip is exceedingly difficult without deformation of the flange of the runner and providing a substantially permanent connection of a clip to the runner insofar as inadvertent disengagement is concerned.

It will also be noted that the portions 8 and 9 of the clip extend parallel to the plane of the flange 16 and engage the latter throughout their length, so that line contacts or engagements extending transversely to one another are provided therebetween rather than point contacts such as achieved by bends or humps.

It will also be noted, referring to FIG. 3 that when the clip is mounted, a plane passing through the intermediate portion 5 normal to the plane of the portions 8 and 9 of the clip will intercept the free end portions 9 so that the load is carried through the clip in approximately a straight line from the intermediate portion 5 through the portions 8 and 9 and the web 15 of the runner, it being noted that the construction permits the portions 8 of the clip to be positioned at the web 13. Consequently with this construction the plane of the body portion 4 comprising the intermediate portion 5 and leg portions 6 extends at an acute angle with respect to the plane of the arms 7, or the plane of the portions 8 and 9.

Where the clip is designed especially for a particular type runner, the length of the free end portions 9 may be proportioned to the distance between the web of the runner and the bead flange or equivalent, whereby the portion 8 may engage the web of the runner, with the extreme ends of the legs 9 being positioned adjacent the bead as illustrated in FIG. 3, thereby restricting lateral movement of the clip relative to the flange.

It will also be appreciated that as the relatively sharp end of the portions 9 will engage the bead, flange or edge portion upon movement of the clip in a disengaging direction, the ends will bite into the abutment formed rather than cam the arms outwardly to permit the clip to ride over the bead, and thus become disengaged therefrom.

While I have illustrated the clip being so proportioned that the distance between the end or leg portions 9 is less than the width of the supporting member, in some cases it may be desirable to provide greater separation therebetween, while retaining most of the advantages of the invention. One example of such a construction would be where the supporting member is solid bar or a box section whereby the clip could not be applied in the manner heretofore described, thus necessitating the distance between such portions being substantially equal to or greater than the width of the supporting member. However, it will be noted that, in contrast with prior clips, such distance may be less than such width of the supporting member to bring the runner-engaging portions directly below and in opposition to the adjacent face of the supporting member.

It will be appreciated from the above disclosure that I have provided a hanger clip which is exceedingly simple in construction, particularly as compared with the prior art such as Nelson heretofore referred to and the like, at the same time providing easier application of the clip and simultaneously therewith considerably greater retentive action on the part of the clip against accidental displacement and disengagement. Furthermore, a clip embodying the present invention provides a very firm bearing connection in transverse directions between the runner and the clip which bearing may be positioned in direct opposition to the supporting member.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A wire clip for securing the flange of a runner to a supporting member, comprising a generally U-shaped body member, having the intermediate portion thereof of a length to overlie such a supporting member, the leg portions of said body member lying in a common plane and diverging from said intermediate portion, each leg portion terminating in an arm extending transversely to the plane of said body portion with said arms lying in a common plane and each having their free ends bent laterally toward one another and then toward the plane of such body portion to form U-shaped end portions, the laterally extending portions and free ends of said U-shaped end portions being positioned in a common plane, the angle between said last mentioned plane and that of said body portion being acute to position such free ends of a mounted clip in engagement throughout their length with such a runner flange at points therealong adjacent to the supporting member, with a plane containing said intermediate portion of a mounted clip and extending normal to the plane of said free ends intersecting the latter, the distance between the plane of said free ends and intermediate portion of said body member, when the clip is unmounted, being less than the combined distance of the depth of the supporting member and thickness of the runner flange, whereby said clip may be manually sprung into engagement with said runner flange.

2. A clip as defined in claim 1, wherein said free ends of said U-shaped portions extend substantially parallel to one another and are spaced a distance less than the length of said intermediate portions of the said body member to position said free ends of a mounted clip directly opposite the lower face of such a supporting member.

3. A wire clip for securing the flange of a runner to a supporting member, comprising a generally U-shaped body member having the intermediate portion thereof of a length substantially equal to the width of such a supporting member and adapted to overlie the latter, the leg porions of said body member lying in a common plane and diverging from said intermediate portion, each leg portion terminating in an arm extending transversely to the plane of said body member with said arms lying in a common plane and each having their free ends bent laterally toward one another and then toward the plane of such body portions to form U-shaped end portions, the free ends of said U-shaped end portions being positioned in a common plane, the angle between the plane of said free ends and that of said body member being acute to position such ends of a mounted clip in engagement throughout their length with such a runner flange at points therealong adjacent to the supporting member, with a plane containing said intermediate portion of a mounted clip and extending normal to the plane of said free ends intersecting the latter, the distance between the plane of said free ends and intermediate portion of said body member, when the clip is unmounted, being less than the combined distance of the depth of the supporting member and thickness of the runner flange, whereby said clip may be manually sprung into operative engagement with said runner flange.

4. A clip is defined in claim 3, wherein said free ends of said U-shaped portions extend substantially parallel to one another and spaced a distance less than the length of said intermediate portions of the said body member to position said free ends of a mounted clip directly opposite the lower face of such a supporting member.

5. A wire clip for securing the flange of a runner to a supporting member, comprising a generally U-shaped body member having the intermediate portion thereof of a length substantially equal to the width of such a supporting member and adapted to overlie the latter, the leg portions of said body member diverging from said intermediate portion with the ends of said leg portions lying in a common plane, each leg portion terminating in an arm extending transversely to said plane with said arms lying in a common plane and each having their free ends bent laterally toward one another and then toward the plane of the ends of such leg portions to form reversely bent end portions, the free ends of said reversely bent end portions being positioned in a common plane, the angle between the plane of said free ends and that of said arms being acute to position such ends of a mounted clip in engagement with such a runner flange at points therealong adjacent to the supporting member, with a plane, containing said intermediate portion of a mounted clip and extending normal to the plane of such a runner flange, intersecting said free ends, the distance between the plane of said free ends and intermediate portion of said body member, when the clip is unmounted, being less than the combined distance of the depth of the supporting member and thickness of the runner flange, whereby said clip may be manually sprung into operative engagement with said runner flange.

No references cited.